United States Patent [19] [11] 3,856,984

Merlino, Jr. et al. [45] Dec. 24, 1974

[54] SYSTEM FOR ANTICIPATING AN IMPENDING LOSS OF INFORMATION AND FOR GENERATING A RESTRAINT SIGNAL IN RESPONSE THERETO

[75] Inventors: Eugene L. Merlino, Jr., Dearborn Heights; Roger S. Naeyaert, Jr., Grosse Point Woods; Jonas Ellis, Birmingham, all of Mich.

[73] Assignee: Burroughs Corporation, Detroit, Mich.

[22] Filed: Sept. 19, 1972

[21] Appl. No.: 290,317

Related U.S. Application Data

[63] Continuation-in-part of Ser. No. 116,799, Feb. 19, 1971, abandoned.

[52] U.S. Cl. .............................................. 178/23 A
[51] Int. Cl. .............................................. H04l 1/00
[58] Field of Search ........... 178/4.1 B, 23 A, 28, 29, 178/32, 34, 35, 38, 40, 699, 69 M, 69.5, 53; 340/172.5; 235/153 A

[56] References Cited

UNITED STATES PATENTS

| | | | |
|---|---|---|---|
| 2,998,483 | 8/1961 | Curtis | 178/23 A |
| 3,240,920 | 3/1966 | Barbagall et al. | 340/172.5 |
| 3,296,960 | 1/1967 | Felcheck et al. | 340/172.5 |
| 3,328,766 | 6/1967 | Burns et al. | 340/172.5 |
| 3,376,384 | 4/1968 | Achramowicz | 178/17.5 |
| 3,649,758 | 3/1972 | Clark | 178/69.5 R |

OTHER PUBLICATIONS

Handbook or Automation Computation and Control, Vol. 2, by Grabbe et al., 10/59, John Wiley & Sons, page 17–08.

*Primary Examiner*—Harvey E. Springborn
*Attorney, Agent, or Firm*—Charles P. Padgett, Jr.; Charles S. Hall; Edward G. Fiorito

[57] ABSTRACT

A logic system for preventing the loss of information which may occur when synchronization between a transmitter and a receiver is momentarily lost because data is being transmitted from a central computer or a telegraph sender to a plurality of buffer storage units at a rate greater than the rate at which the data can be removed from the buffer storage units for printing. At some time prior to the actual loss of information, a set of particular circuit conditions will exist. This set of conditions is used to establish a threshold logic state and the attainment of this state indicates that a loss of information is anticipated. A logic circuit is used to monitor synchronization, to detect the attainment of the threshold logic state and to cause the generation of a restraint signal in response to the attainment of the threshold logic state for temporarily inhibiting the further transmission of data until synchronization is restored.

7 Claims, 7 Drawing Figures

SYSTEM FOR ANTICIPATING AN IMPENDING LOSS OF INFORMATION AND FOR GENERATING A RESTRAINT SIGNAL IN RESPONSE THERETO

RELATED APPLICATIONS

This application is a continuation-in-part of application Ser. No. 116,799 filed on Feb. 19, 1971 by the present inventors and now abandoned.

BACKGROUND OF THE INVENTION

In a printing device, such as a telegraphy receiver or a remote data terminal for a centrally located computer, it is necessary to synchronize the flow of data from a data source (e.g., a sending telegraph unit or a computer) to a receiving terminal or printing unit. When a printer uses a rotating print drum, print wheel, or any similar cyclic printing element, lack of synchronization may be caused by deviations in the print wheel frequency or in the computer transmission frequency, or both, and either may result in one or more extra spaces in the printed text or in the loss of information arriving more rapidly than it can be printed out.

Assuming that the computer is transmitting data at a fixed rate, fluctuations in the voltage or frequency being supplied to the motor, which is used to operate the print drum or wheel, may cause the angular velocity of the print drum or wheel to vary. A voltage surge or increase in frequency may cause the angular velocity of the print drum or wheel to increase causing an unwanted space to appear in the printing sequence or text. Alternatively, a drop in the voltage or frequency may cause a slow-down of the print wheel and a character may be lost since the frequency of the incoming data will exceed that of the print wheel. Similarly, if the print wheel frequency is maintained at a constant rate, then a change in the transmission rate of data from the central processor or telegraph sender to the remote data terminal may cause either an unwanted space to appear in the text or a loss of one or more characters of information.

SUMMARY OF THE INVENTION

With the above-mentioned problem of synchronization in mind, it is an object of this invention to provide a new and improved logic circuit for restoring synchronization between the flow of data from a central processor to a remote data station and the printing of the data at the remote station.

It is also an object of this invention to provide a remote data terminal having a cyclic print media with a plurality of buffer storage registers, anticipation logic and restraint circuitry for preventing a loss of transmitted data due to a loss of synchronization.

It is another object of this invention to prevent the destruction of one or more characters of information which may result whenever the characters arrive at a printing location faster than they can be utilized by the printer.

It is a further object of this invention to prevent the loss of information which may result when data is transmitted at rate greater than the rate at which the data can be utilized at a remote data station.

It is still another object of this invention to provide a logic circuit for anticipating an impending loss of information and for generating a restraint signal in response thereto for inhibiting the further transmission of data until synchronization can be restored.

BRIEF DESCRIPTION OF THE DRAWINGS

The above-cited objects of the invention together with other objects and advantages which may be obtained by its use, will be apparent from the following detaiied description of the invention taken in conjunction with the drawings wherein like characters identify corresponding points of the timing diagram.

DETAILED DESCRIPTION OF THE INVENTION

Figure 1:
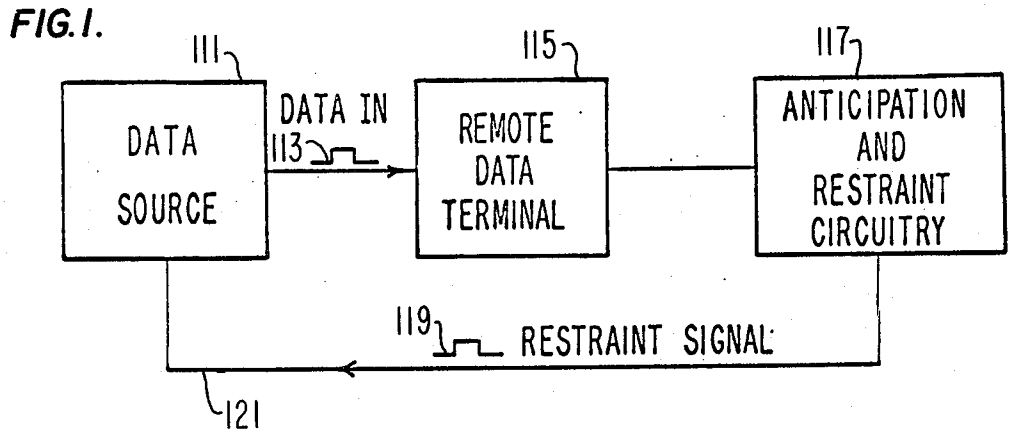
FIG. 1 is a block diagram of a data system utilizing the present invention.

The present invention can be utilized at a printing station of a computer or at a remote data terminal which is controlled by a centrally located computer. In addition, this invention may be utilized in the telegraphy art where a signal is transmitted in one location and is received and printed at another location. Furthermore, this invention may be used wherever a synchronous flow of data from one point to another is to be maintained, such as between a pair of remote terminals; between a terminal and a data collection terminal; or the like.

In the preferred embodiment, the invention is utilized in a remote data terminal having a rotating print drum, a print wheel, or any similar cyclic printing element. Hereinafter, the term "print element" will be used to refer to any such rotating print wheel, drum, belt, or the like. Characters on the periphery of the print element may, for example, follow a circular or a helical path. A single print hammer mounted on a transversely movable carriage for printing one letter at a time as the carriage moves to effect a line of print or a plurality of print hammers may be used, regardless of whether a print or print drum is utilized. These systems are well-known in the art and are not part of the present invention. The type of serial printer contemplated for use in the preferred embodiment would be the type disclosed in U.S. Pat. No. 3,472,352 to N. Kondor, Jr. and assigned to the assignee of the present invention. Similar printer systems and systems for controlling such printer systems are also well-known in the art as illustrated by the following U.S. Patents: Pat. No. 3,024,723 to C. I. Wasserman; Pat. No. 3,193,802 to A. J. Deerfield; Pat. No. 3,240,920 to C. J. Barbagallo et al; and Pat. No. 3,296,960 to M. Felcheck et al. These patents are cited to show the types of printers, comparators, hammer actuators, character scanners, input buffers, null pulse or timing pulse generators, and the like, well recognized as being old in the art.

The print element may have a plurality of characters and a "null" or a space which is devoid of characters on the periphery thereof. Alternatively, the print element may have a plurality of evenly spaced characters on the periphery and a reference mark of some sort replacing the "null."

In addition, the preferred embodiment of this invention contemplates the use of a pair of buffer storage units. The number of buffer storage units used could be extended to any number. Embodiments employing three and six buffer registers respectively have been successfully tested and are readily designed following the teachings of this invention.

The pair of buffer storage units of the prime embodiment disclosed herein is used to receive and store alternate characters of transmitted data and to retain the stored character until a corresponding character is printed. As indicated previously, when a loss of synchronization occurs, an unwanted space may appear in the printed text or there may be a loss of one or more characters depending on whether the printer is operating faster or slower than the flow of data from the central processor.

To obviate the problem of unwanted space in the printed text, the rate or frequency of the transfer of data from the central computer or data source to the data terminal is set so that it will never be less than the maximum frequency at which the print element will operate. Thus, the remaining problem of synchronization will relate to the loss of data which may occur when the incoming data frequency exceeds the rate at which the printing operation utilizes the data. This could occur if the print element were to slow down during a power lag or if the central process were to speed up as from a power surge. The present invention monitors the state of specific system signals, detects a threshold logic state indicative of an impending information loss and generates a restraint signal for causing the central processor to inhibit one character of information from being transmitted from the computer, thereby allowing the printer time to "catch up" with the incoming information and insuring that synchronization is restored.

Referring first to FIG. 1, the present invention is illustrated in the overall environment in which it is used. A data source 111, which may be a central computer, telegraph sender or the like, is used to send data signals, represented by the "Data In" pulse 113 to a remote data terminal 115 which may be a remote printer or telegraph receiver or the like. The data source may, for example, be a central computer such as the Burroughs B5500 as disclosed in the *Burroughs B5500 Electronic Information Processing System Operation Manual* which was copyrighted in 1963, 1964 and 1966 and updated in Sept. 1968, which is interfaced with the remote terminal via a data set such as Data Set 103A which is described in the *Bell System Data Communications Technical Reference Manual — DATA SET 103A, Interface Specification* which was copyrighted in 1967 by the American Telephone and Telegraph Company. Associated with the remote data terminal 115 is Anticipation Logic and Restraint Circuitry 117 of the present invention. The Anticipation Logic and Restraint Circuitry 117 monitors various system conditions, anticipates an impending loss of information, and generates a restraint signal 119 which is sent back to the data source 111 via feedback path 121 so as to inhibit the further transmission of data until synchronization has been restored.

Figure 2:
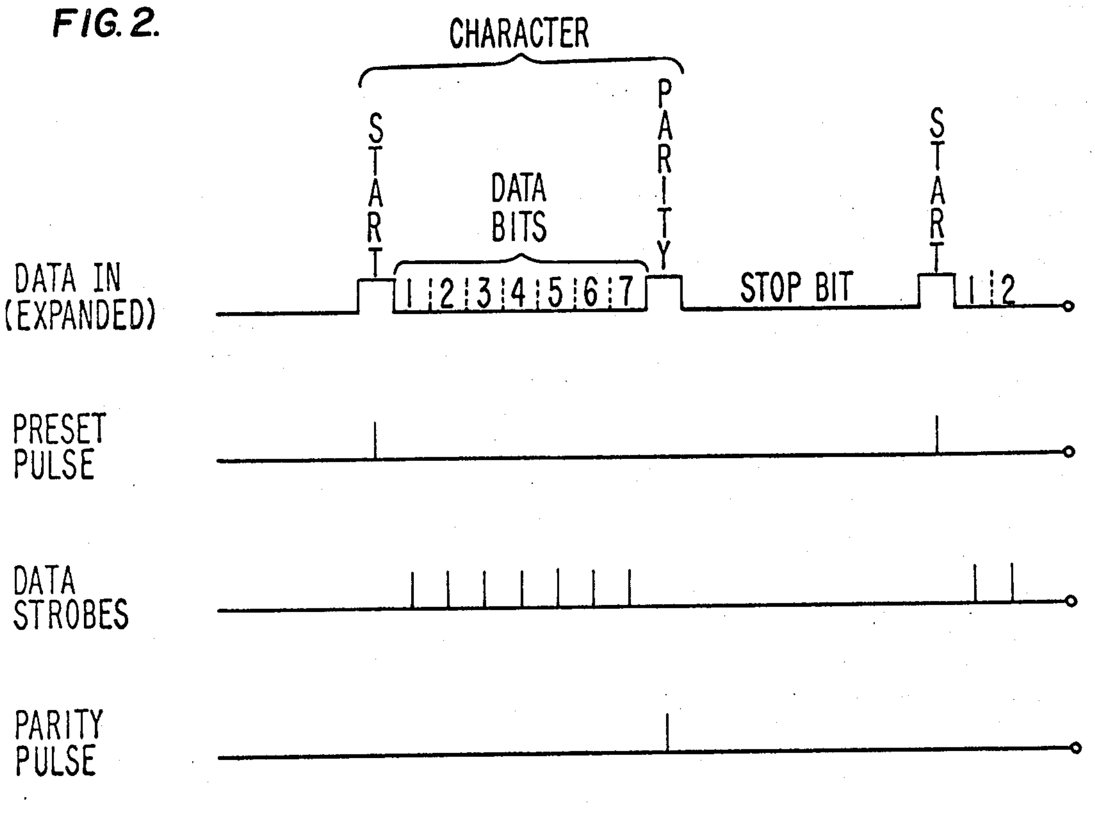
FIG. 2 is a timing diagram depicting an expanded "DATA IN" signal and illustrating the relationship between the various character bits and the related pulses used by the circuitry of the present invention.

FIG. 2 shows the "Data In" pulse 113 of FIG. 1 expanded so as to show the various bits of any given character pulse. The first line of FIG. 2 shows the entire character broken down into individual bit pulses while the second, third and fourth lines show the time relationship of the "Preset" pulses, "Data Strobe" pulses, and "Parity" pulses, respectively.

Figure 3:
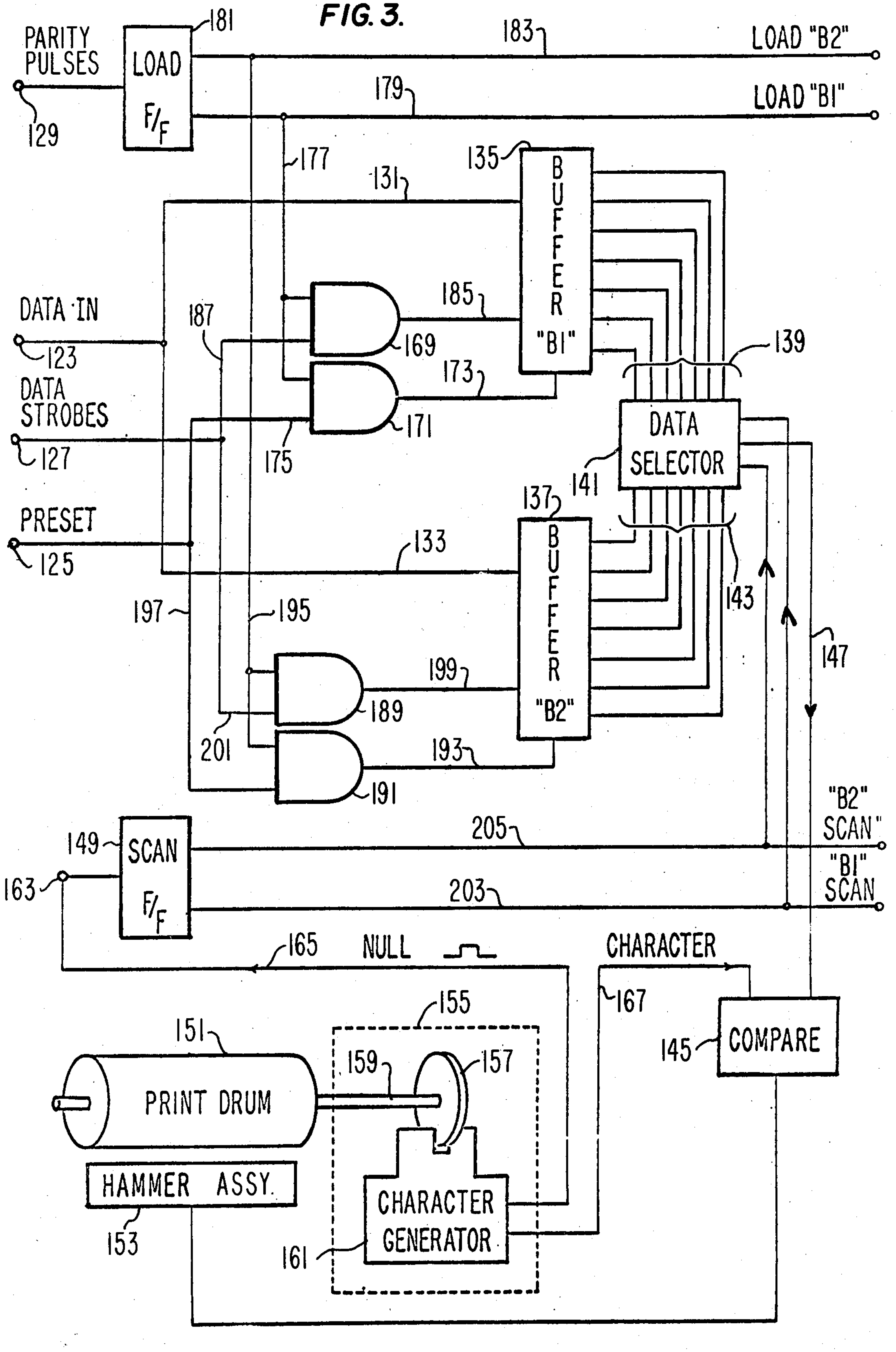
FIG. 3 is a schematic diagram illustrating in greater detail the Remote Data Terminal of FIG. 1.

FIG. 3 illustrates the basic features of the remote data terminal 115 of FIG. 1. The "Data In" signals 113 of FIG. 2 are fed into input terminal 123 and the related or derived pulses, i.e., the "Preset" pulses, "Data Strobe" pulses and "Parity" pulses, are fed into input terminals 125, 127, and 129, respectively. The manner in which these pulses are generated forms no part of the present invention and any number of methods would be readily obvious to one skilled in the art.

The "Data In" signals are received at input terminal 123 and are fed via lead 131 to a buffer storage unit, Buffer B1, and via lead 133 to a second buffer storage unit, Buffer B2. In the prime embodiment disclosed herein, Buffer B1 comprises an eight-bit shift register 135 and Buffer B2 comprises an eight-bit shift register 137.

As shown in FIG. 2, a character is represented by seven data bits. Hence, seven leads 139 couple the seven character-representing stages of the shift register 135 of Buffer B1 to a data selector 141, and a corresponding set of seven leads 143 couple the seven character-representing stages of the shift register 137 of Buffer B2 to the data selector 141.

The data selector 141 operates to "SCAN" or select either the contents of Buffer B1 or the contents of Buffer B2 at any one time. The buffer being scanned or selected has its contents fed to one input of a comparator 145 via transfer path 147. The determination of which buffer is selected is made by SCAN flip-flop 149 which changes state with each occurrence of a null or reference pulse which is taken from the rotating printing element.

For illustration purposes, a rotating print drum 151 is shown, and associated with the print drum 151 is a hammer assembly 153 and a sensing means 155. The sensing means may include a code disc 157 which is coupled to the print drum 151 by a shaft 159. A character generator 161 reads the code disc 157 and generates a set of signals representing the characters on the drum, and once each revolution, a null or reference pulse, as known in the art.

The null pulses are sent to input terminal 163 of the SCAN flip-flop 149 via lead 165 and the character-representing pulses are fed to the second input of comparator 145 via character path 167. When a valid comparison exists, the character presently stored in the buffer being scanned corresponds to the character on the print drum 151 currently in a printing position and the hammer assembly is activated to print the character, as known in the art.

Buffer B1 has associated with it a pair of AND gates 169 and 171. The output of AND gate 171 is coupled to Buffer B1 by a lead 173 and is used to initially preset a 1 into the first stage of the shift register 135. This preset 1 can be used as a "buffer-full" signal when it has been shifted to the eighth stage of the shift register 135. One input of AND gate 171 comes via a lead 175 from input terminal 125 which is supplied with the "Preset" pulses of FIG. 2. The other input of AND gate 171 is taken via lead 177 from the LOAD "B1" output lead 179 of LOAD flip-flop 181.

The LOAD flip-flop 181 changes state with every occurrence of a "Parity" pulse at input terminal 129. The two states of LOAD flip-flop 181 are "LOAD B1" which is taken from output lead 179 and "LOAD B2" which is taken from output lead 183. These states indicate which of the two buffers is currently in the process of being loaded by the incoming Data In signal.

AND gate 169 has its output coupled to Buffer B1 via lead 185 and pulses conducted over this lead are used to shift the data and load the shift register 135. One input of AND gate 169 is taken from output lead 183 of LOAD flip-flop 181 via lead 177 and the second input is taken from the Data Strobe input terminal 127 via lead 187.

Similarly, a pair of AND gates 189 and 191 are associated with Buffer B2. AND gate 191 supplies the first stage of shift register 137 with a preset 1 via lead 193. The two inputs of AND gate 191 are the LOAD B2 signal of output lead 183 of LOAD flip-flop 181 via connecting lead 195 and the Preset signals of input terminal 125 via lead 197.

AND gate 189 provides the shift pulses for Buffer B2 via lead 199. The inputs of AND gate 189 are taken from Data Strobe pulse input 127 via lead 201 and from the LOAD B2 output lead 183 of LOAD flip-flop 181 via lead 195.

Assuming the LOAD flip-flop 181 has just switched to the LOAD B1 state, then Buffer B1 is being loaded. A binary 1 is first preset into the first stage of shift register 135 and then the character data is fed and shifted into the first seven stages. Meanwhile, SCAN flip-flop 149 is in the SCAN B2 state. Buffer B2 is being scanned and the contents printed when comparator 145 indicates that the character stored in Buffer B2 corresponds to the character on the print drum which is currently in a printing position. At the end of a complete rotation, a null pulse is generated by character generator 161 and is fed to SCAN flip-flop 149 via lead 165. SCAN flip-flop 149 changes state and Buffer B1 is scanned by the data selector 141. Meanwhile, a Parity pulse has switched LOAD flip-flop 181 so as to enable the loading of Buffer B2 with the next character of data.

Figure 4:
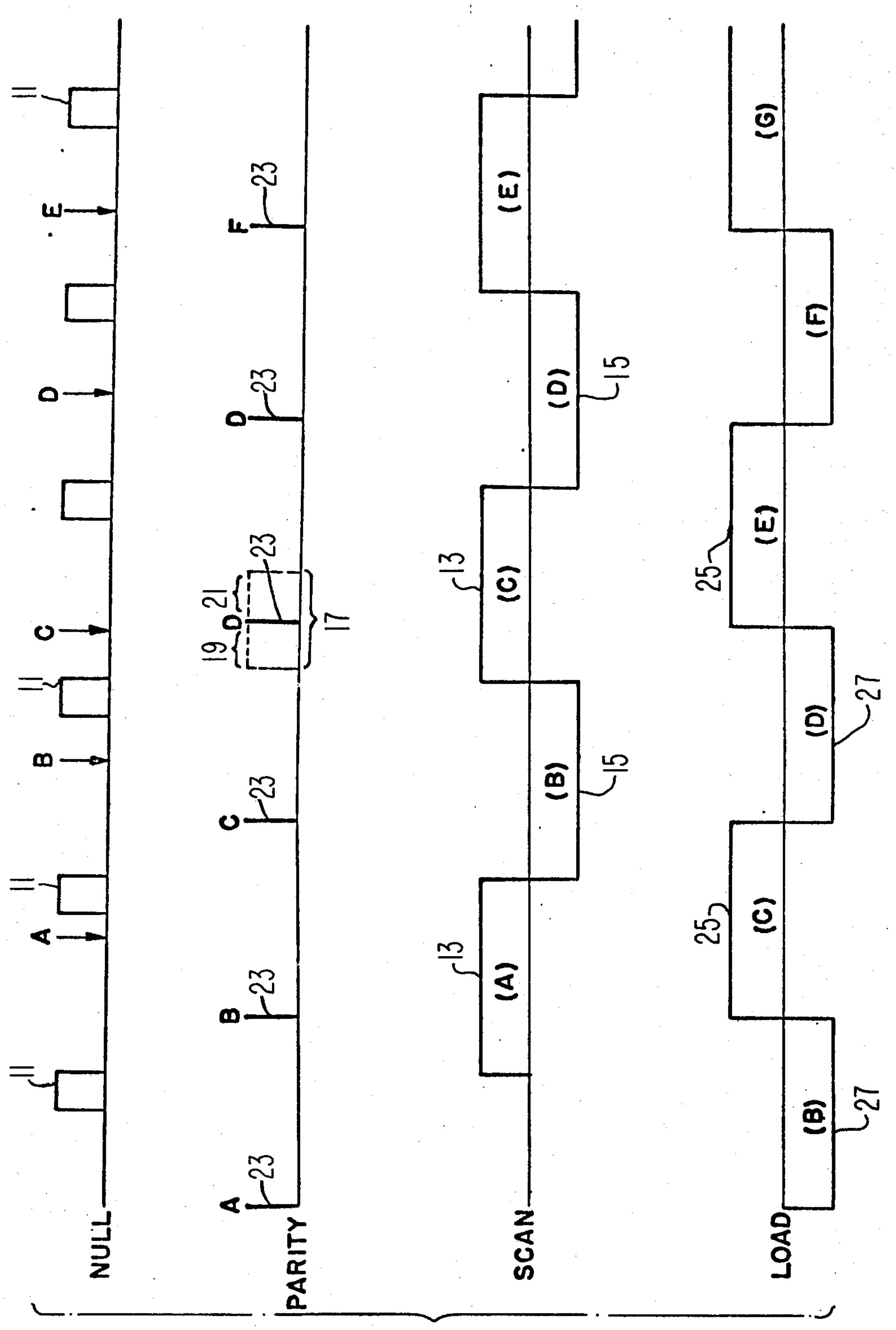
FIG. 4 is a timing diagram for normal data flow at a data terminal.

Referring next to FIG. 4, the normal timing operation of the remote data terminal will be explained. The first abscissa on the timing diagram is labeled NULL and the location of pulses 11 on this abscissa indicate the time at which the NULL or reference mark on the code disk 157 of print drum 151 crosses a reference point such as the printing location or location of the hammer assembly 153. Obviously, the NULL passes the print station once during each revolution of the print drum 151 and hence, a single NULL pulse is generated for each revolution of the print drum 151.

The abscissa labeled SCAN refers to that portion of the printing operation during which the contents of a particular buffer storage unit are being compared with the characters passing before the printing station such that when the characters coincide, the hammer assembly is actuated and the character is printed as discussed before herein.

As indicated previously, at least two buffer storage units, such as Buffer B1 and Buffer B2, or similar storage means, are required in the preferred embodiment of this invention. The invention, of course, is readily adapted to accommodate any greater number of buffer storage units. In all of the SCAN timing diagrams, the positive SCAN pulses 13 indicate the time interval during which the data stored in Buffer B1 is being scanned, compared and printed (i.e., the time during which Buffer B1 is in the "SCAN" mode) and the negative SCAN pulses 15 indicate the time interval during which the data stored in Buffer B2 is being scanned, compared and printed (i.e., the time during which Buffer B2 is in the SCAN mode).

It can be seen from the timing diagrams and from the circuit of FIG. 3, previously described, that the SCAN and the NULL timing diagrams are synchronized. This, of course, is understandable since the operation of comparing the characters on the periphery of the rotating print drum 151 with the characters currently being stored in the buffer storage units presently being selected by data selector 141 must be related to the rotation of the print wheel itself, since the buffer selected for scanning by the data selector 141 is determined by the state of SCAN flip-flop 149 which changes state with each arriving NULL pulse, hence with each rotation of the print drum 151.

Since the SCAN operation is continuous, one and only one of Buffer B1 or Buffer B2 is in the SCAN mode at any given time and the SCAN operation is switched from Buffer B1 to Buffer B2 on the trailing edge of the NULL pulse 11. It is appreciated, of course, that no comparison takes place during the occurrence of the NULL pulse since there are no characters on the NULL portion of the print element. If a reference mark was placed on the print drum, in lieu of the null, then the SCAN flip-flop 149 would change from one state to another and hence the data selector 141 change from the scanning of one buffer to the scanning of another in synchronism with the reference pulse.

The abscissa on the timing diagram of FIG. 4 labeled PARITY indicates the location of parity bits 23 in the flow of data from the data source 111 to the remote data terminal 115 as shown in FIG. 2. Referring to this abscissa, a dotted pulse 17 is seen superimposed around a parity bit 23. This pulse 17 indicates a plurality of bits of information and regardless of the specific code used, such a pulse may be thought of as including information bits 19, the parity bit 23 and control bit 21. For clarity, only the location of the parity bit in each information group is shown in the timing diagram of this invention. Therefore, the plurality of parity bits 23 is to be considered merely as the location of each of the parity bits with respect to this information.

The fourth abscissa of FIG. 4 is labeled LOAD. As the data is transferred from the data source 111, it is loaded into the buffer storage units, Buffer B1 and Buffer B2, on an alternating basis. In the timing diagram of FIG. 4, the time during which information may be loaded into Buffer B2 is indicated by the positive LOAD pulses 25 (i.e., the time during which Buffer B1 is in the LOAD mode) and the time during which information may be loaded into Buffer B2 is indicated by the negative load pulses 27 (i.e., the time during which Buffer B2 is in the LOAD mode). As discussed previously, the determination of which of the buffer storage units is currently in the LOAD mode is determined by the state of LOAD flip-flop 181.

The abscissa labeled LOAD is in synchronization with the frequency of the incoming data as indicated by the frequency of parity bits 23. The state of the LOAD flip-flop 181 undergoes a change in response to the parity bits 23 as they arrive at the input terminal 129 of LOAD flip-flop 181. Hence, the loading of Buffer B1 or Buffer B2 is triggered by the parity bits of each incoming character. Therefore, as soon as each parity bit is received, the character of information has been stored by a buffer and the state of the LOAD pulse, as seen on the timing diagram, changes as the other buffer unit switches to the LOAD mode and awaits the arrival of the next character.

To explain the operation of the printer with respect to the timing diagram, consider that the first few letters of the alphabet A, B, C, . . . are to be printed in sequence. Looking at the PARITY abscissa, it is noted that the letters A, B, C, . . . are indicated above the parity bits 23. This is to indicate the flow of data from the data source to the printing terminal. The letters inside the pulses on the LOAD abscissa indicate which of these characters is being loaded into the particular buffer storage unit during that time period. Recall that positive pulses indicate the loading of Buffer B1 and negative pulses indicate the loading of Buffer B2. Thus, at the parity bit labeled "A," the character A has been loaded and since there was a positive load pulse, it has been loaded into Buffer B1. Similarly, the letter "B" has been loaded in Buffer 2 and so on.

After the letter A has been loaded, on the next revolution of the print element 151 past the print hammer assembly 153, the internal logic of FIG. 3 compares the character stored in Buffer B1 with the characters on the periphery of the print drum as they pass the hammer assembly 153, as known in the printing art. This is shown by the pulse on the SCAN abscissa having the letter A within parentheses. At the time that the letter A on the print element 151 passes the hammer assembly 153, a hammer is actuated and the character A is printed on the paper. This is shown on the NULL abscissa by the letter A above an arrow pointing vertically downward. The location of the arrows pointing vertically downward on the NULL abscissa are illustrative only and are not to be taken as representing the particular arrangement of the letters on the periphery of the print element or the particular sequence or time at which they actually occur.

From this description of the operation, it can be seen that while one buffer storage unit is being loaded, a different buffer storage unit is being scanned to cause a character to be printed. If three or more buffers were used, there would be an extra print element revolution delay for each additional buffer before a buffer is scanned to cause its contents to be printed.

Figure 5:
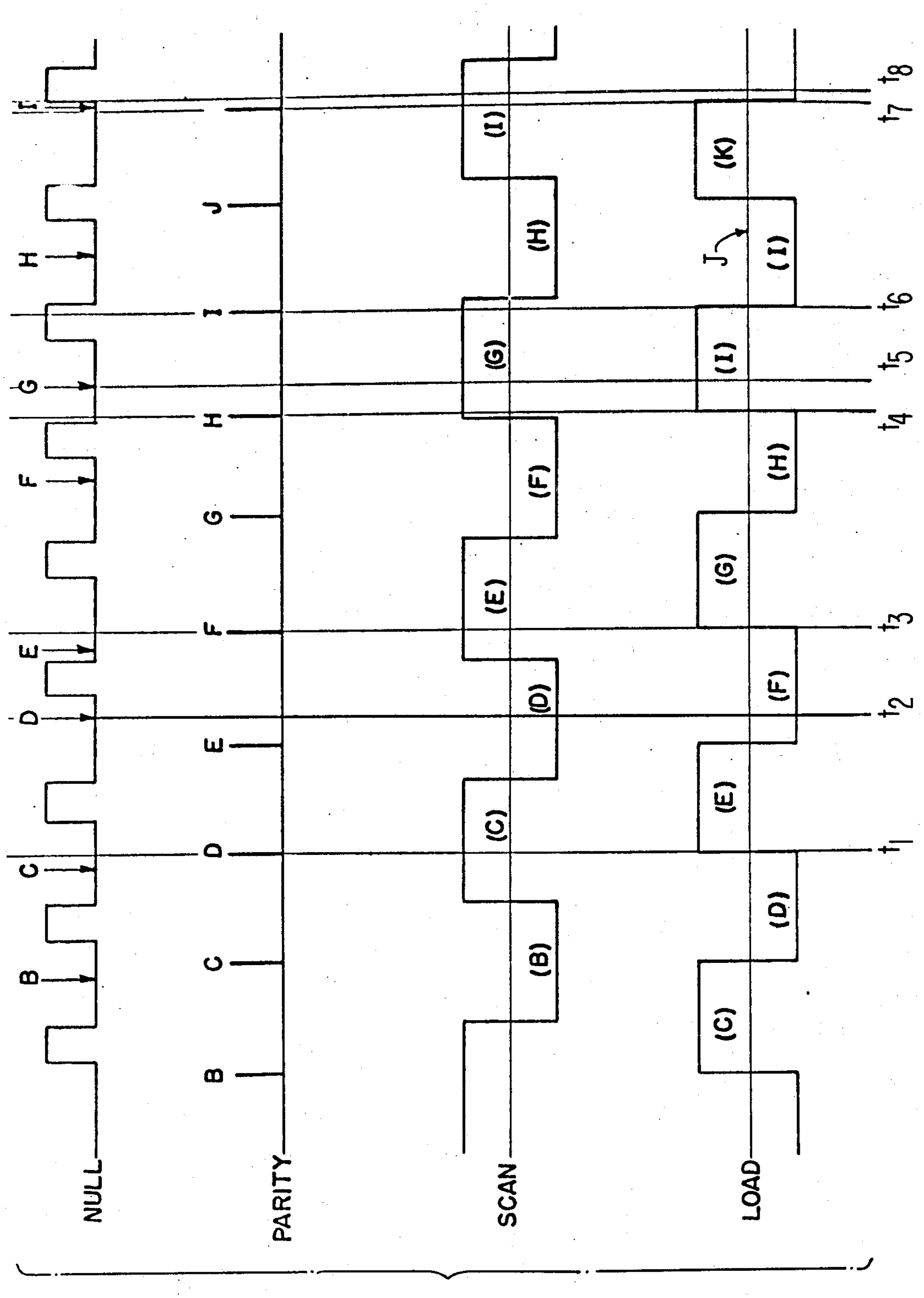
FIG. 5 is a timing diagram depicting a situation wherein incoming data to a data terminal is not synchronized with the printing operation (i.e., where the transmitted data is arriving at the buffer storage units at a rate greater than the rate at which the data is removed from the buffer storage units by the operation of the printer)
Figure 6:
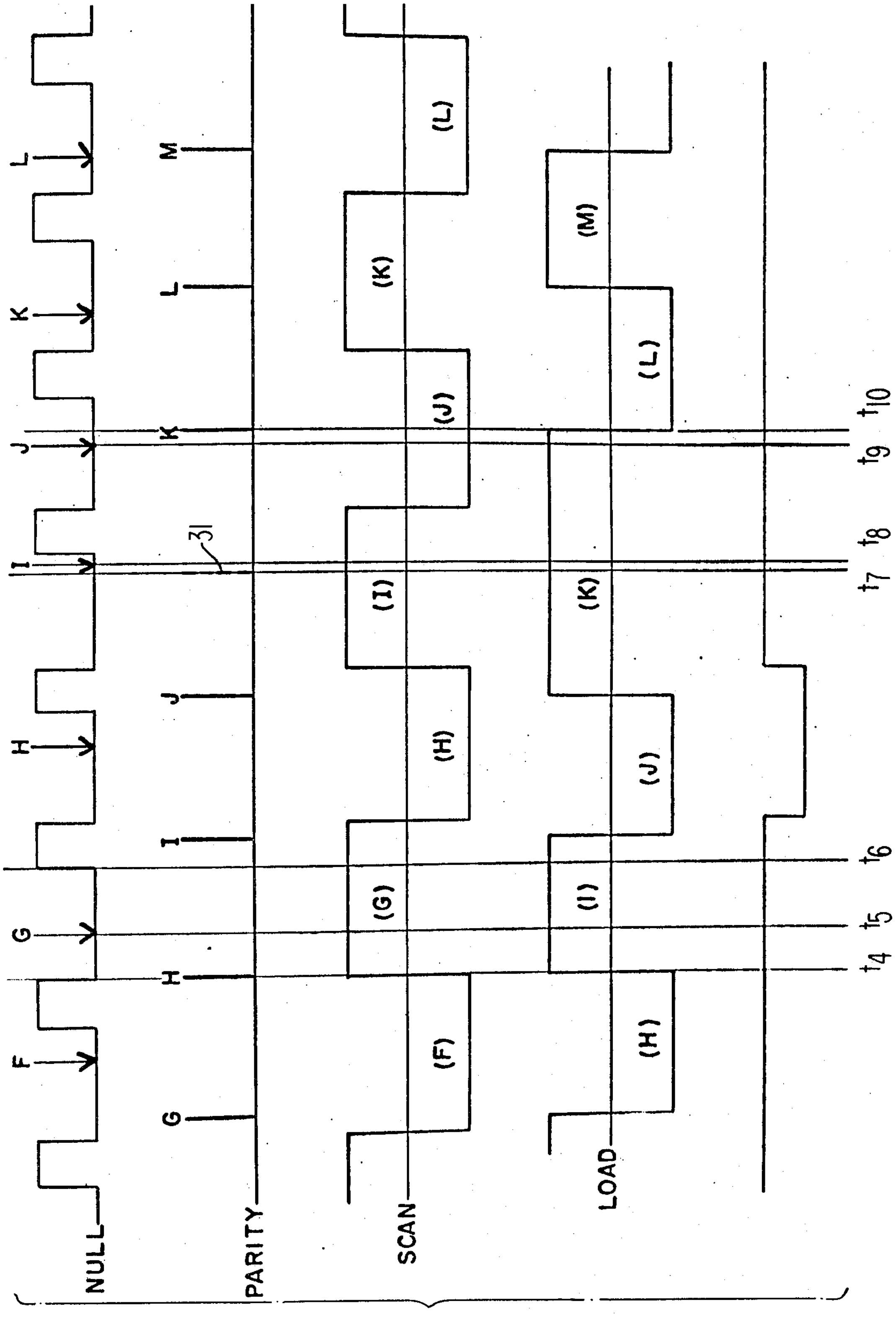
FIG. 6 is a timing diagram showing the conditions of lack of synchronization between the flow of data into a data terminal and the utilization of the data at the data terminal necessitating the generation of a restraint signal and the effect of the generation of the restraint signal.

Referring next to FIG. 5, a timing diagram is shown for the conditions under which a loss of synchronization has occurred because the frequency of the incoming data is greater than that of the print element. In other words, data is being received at the inputs of the buffer storage units at a rate greater than the rate at which data is being removed from the buffer storage units by the operation of the printer. In the timing diagrams of FIG. 5 and FIG. 6, it is understood that the loading of Buffer B1 and the scanning of Buffer B1 are represented by positive LOAD and SCAN pulses, respectively, and the loading and scanning of Buffer B2 appear as negative pulses. The pulses of FIGS. 5 and 6 are numbered as indicated in FIG. 4. The letters in the SCAN and LOAD pulses, the letters above the parity bits and the letters above the arrows on the NULL abscissa, indicate the character being compared, loaded, transmitted, and printed, respectively.

In the timing diagram of FIG. 5, t1 indicates the time of the loading of the letter D into Buffer B2. On the next revolution of the print drum 151, the character D is printed and this can be seen at time t2. At time t3, the character F is loaded into Buffer B2. Since character D in Buffer B2 has already been printed at time t2, Buffer B2 is empty and can receive the character F at time t3. Proceeding to time t4 it will be seen that the letter H is loaded into Buffer B2. Shortly thereafter, at time t5, the character G which was previously loaded into Buffer B1 is printed. At time t6, character I is loaded into Buffer B1. Buffer B1 has just printed character G at time t5 and is therefore empty and able to receive character I.

Then, at time t7, there is an attempt to load the character K into Buffer B1. However, Buffer B1 has not yet completed the printing of character I; therefore, Buffer B1, still having character I stored therein, causes a rejection to the loading of the character K. Character I in Buffer B1 is not printed until time t8. The loss or rejection of character K has occurred since the frequency of incoming data, as indicated by the frequency of the parity bits, has increased relative to the frequency of utilization of the data, which is represented by the frequency of rotation of the print element as shown by the frequency of occurrence of the null pulses on the NULL abscissa.

Referring to FIG. 6, part of the timing diagram of FIG. 5 is again shown and the conditions for restraint will be explained. The times t4 through t8 in FIG. 6 correspond to the same times as in FIG. 5. It is noted that the parity bit of character I occurs during the time interval of the NULL pulse beginning at time t6. This may be referred to as a parity bit occurring during a null. In the Anticipation Logic and Restraint Circuitry 117, which will be explained later, the occurrence of a parity bit during a null is one of the conditions which must occur in order to establish a threshold logic state indicative of the anticipation of an impending loss of one or more characters of information so as to cause a restraint pulse 29 to be generated.

At time t6, it will also be seen that Buffer B1 is being scanned to print the letter G and that the buffer being loaded with character I is also Buffer B1. The second condition necessary to establish the threshold logic state indicative of the anticipation of an impending information loss and to insure the generation of a restraint pulse is that the same buffer, either Buffer B1 or Buffer B2, must be in both the SCAN mode and the LOAD mode simultaneously at parity time.

The simultaneous satisfaction of the first and second conditions establishes a threshold logic state indicative of the fact that information is arriving at the buffer storage units faster than it can be utilized by the printer. Hence, the attainment of this threshold logic state, signifies that an impending loss of information is anticipated and a restraint pulse must be generated in order to temporarily inhibit the further transmission of data until synchronization has been restored.

The simultaneous conditions required for the generation of the restraint signal occur during the NULL pulse beginning at time t6, the threshold logic state is detected, and a restraint signal, pulse 29, is generated. The restraint pulse 29 lasts for one revolution of the print element, and circuitry is provided so as to prevent retriggering as will be explained later. There is a propagation time or time delay from the generation of the restraint pulse 29 until the signal reaches the data source 111 and inhibits the further transmission of data. As a result of this propagation time, FIG. 6 illustrates that one more character, J, is loaded in the alternate Buffer B2 which does not cause a data loss problem since Buffer B1, having a character K, causes the data loss and not Buffer B2.

In the absence of the restraint signal, character K would be transmitted at time t7 and would be rejected and lost. This is illustrated by the dotted parity bit 31 at time t7. However, the generation of restraint pulse 29 delays the transmission of character K approximately one revolution of the print element to time t10. In the interval between time t7 and time t10, the character I has been printed at time t8. Then, at time t10, the character K is transmitted. No data is rejected and synchronization is now restored.

Figure 7:
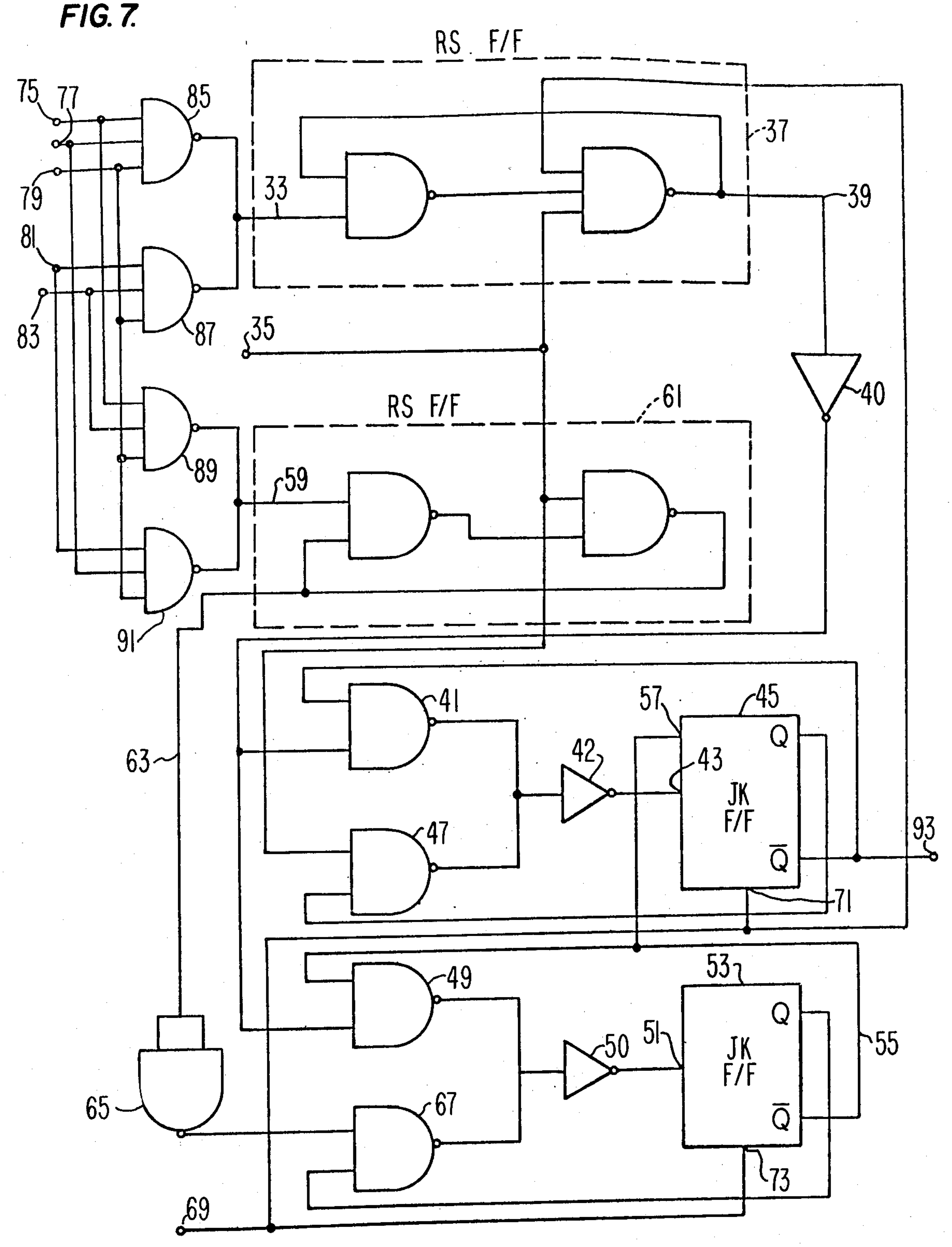
FIG. 7 is a schematic diagram illustrating in greater detail the Anticipation Logic and Restraint circuitry of FIG. 1.

Referring now to FIG. 7, the logic circuitry used to detect the attainment of a threshold logic state, to anticipate an impending information loss, and to generate the restraint pulse to temporarily inhibit further data transmission in response thereto will be explained.

As indicated previously, the satisfaction of two conditions is required in order to establish a threshold logic state and indicate the anticipation of an impending loss of one or more characters of information so as to cause the generation of a restraint pulse. The satisfaction of the first of these two conditions requires that a single one of the buffer storage units is in both the LOAD and the SCAN mode at the time; occurrence of a parity pulse; in other words, the buffer which is next scheduled to receive a character (i.e., the buffer in the LOAD mode) is the same buffer which is being scanned for the next character to be printed (i.e., the buffer in the SCAN mode).

A system of conventional logic gates, such as a pair of NAND gates 85, 87, is used so that a pulse will be supplied to input 33 of the RS flip-flop 37 when this first condition is satisfied. The inputs to the NAND gate 85 include LOAD Buffer B1 input 75, which is taken from output lead 179 of LOAD Flip-Flop 181 of FIG. 3, SCAN Buffer B1 input 77, which is taken from output lead 203 of SCAN flip-flop 149 of FIG. 3, and parity pulse input 79.

The inputs to NAND gate 87 include LOAD Buffer B2 input 81 which is taken from output lead 183 of LOAD flip-flop 181 of FIG. 3, SCAN Buffer B2 input 83 which is taken from output lead 205 of SCAN flip-flop 149 of FIG. 3, and parity pulse input 79. Hence, whenever Buffer B1 is in both the LOAD mode and SCAN mode at parity, NAND gate 85 will supply a pulse to input 33 and whenever Buffer B2 is in both the LOAD mode and the SCAN mode at parity, NAND gate 87 will supply a pulse to input 33.

The satisfaction of the second of the two conditions required for the establishment of the threshold logic state and the generation of the restraint pulse is that the parity pulse must occur during a null. The NULL pulses are fed from the character generator 161 of FIG. 3 via lead 165 to input 35 of the RS flip-flop 37. When both of these two conditions are simultaneously satisfied, the occurrence of the parity pulse at input 79 will initiate the generation of a triggering pulse at output 39 of the RS flip-flop 37 which will continue until the termination of the NULL pulse at input 35 of the RS flip-flop 37.

The presence of a triggering pulse at the output 39 of the RS flip-flop 37 indicates that the conditions that are necessary to indicate an impending information loss have been met, that the threshold logic state has been attained and that a restraint pulse must be generated. This triggering pulse is fed from output 39 through inverter 40 to NAND gate 41 which passes a signal through inverter 42 to clock input 43 of the JK binary signal flip-flop 45 and causes the generation of a restraint pulse at output 93. The restraint pulse is transmitted back to the data source and used to inhibit further data transmission for the duration of the pulse.

The condition of JK flip-flop 45 during which the restraint pulse is generated is called space and the nonrestraint condition is called mark. In binary terms, when the $\bar{Q}$ output of JK flip-flop 45 is low, the flip-flop is in a space condition. Normally, the $\bar{Q}$ output of JK flip-flop 45 is high and the flip-flop is in a mark condition. The arrival of the pulse from NAND gate 41 to the clock input 43 will trigger JK flip-flop 45 from a mark to a space condition provided that a high is present at synchronous set input 57. The next pulse to arrive at input 35 will be transmitted to NAND gate 47 which will pass the signal through inverter 42 to the clock input 43 of JK flip-flop 45 and reset the flip-flop to the mark condition.

As indicated previously, it is desired to prevent the generation to more than one restraint pulse. This requires that the JK flip-flop 45 be prevented from retriggering to a space condition during the time that the first restraint pulse is being propagated to the computer.

A means for inhibiting the triggering of the space condition requires the following logic considerations: a prevent pulse should turn on under the same conditions which generate the restraint pulse, (i.e., one of the two buffers is in both the LOAD and SCAN modes at parity time and the parity and null pulses occur simultaneously); and the prevent pulse should turn off when one of the buffers is in the LOAD mode while the other is in the SCAN mode at parity time and when a parity pulse occurs at the trailing edge of the NULL.

The triggering pulse which appears at the output 39 of RS flip-flop 37 initiates the generation of the restraint pulse through NAND gate 41 and clock input 43 as stated previously. This same triggering pulse is transmitted from output 39 to NAND gate 49 and passes through an inverter 50 to feed clock input 51 of the prevent pulse-generating JK flip-flop 53. The arrival of this pulse at the clock input 51 changes the state of flip-flop 53 from a high at $\bar{Q}$ to a low; and this low condition is transmitted via lead 55 to synchronous set input 57 of JK flip-flop 45. As soon as this low condition is sensed at input 57 of JK flip-flop 45, the flip-flop 45 cannot be changed to a space condition, the flip-flop is disenabled, and further restraint pulses cannot be generated.

It is desirable that this prevent signal terminate after synchronization has been restored. Therefore, the input 59 of RS flip-flop 61 will receive a signal from a conventional gating network such as NAND gate 89 having inputs 75, 79 and 83 and NAND gate 91 having inputs 77, 79 and 81 and whenever the conditions indicative of the impending information loss are no longer present (i.e., whenever one buffer is in the LOAD mode while the other buffer is in the SCAN mode or vice versa, and whenever a parity pulse occurs at the trailing edge of a null) an inhibit signal termination pulse is produced at output 63 of RS flip-flop 61. This output pulse is inverted by NAND gate 65 and fed to NAND gate 67. When this pulse arrives at NAND gate 67, the signal termination pulse will be supplied through inverter 50 to the clock input 51 of JK flip-flop 53 thereby changing the state of that flip-flop such that the $\bar{Q}$ output will switch from a low condition to a high condition. This high will be transferred by a lead 55 to the synchronous set input 57 of JK flip-flop 45 thereby enabling JK flip-flop 45 to change a space condition, upon the arrival of the next triggering pulse from NAND gate 41 via clock input 43.

At the start of operations, a signal may be supplied to input 69 which leads to a direct clear input 71 of JK flip-flop 45 and direct clear input 73 of JK flip-flop 53. This signal will insure that the JK flip-flops 45 and 53 are initially in a mark condition. This signal may be derived, for example, from the activation of a power switch or from the start of paper motion at a printer location. However, any suitable source may be used.

This circuit is able to direct the attainment of a predetermined threshold logic state anticipatory of an impending loss of information such as may result when transmitted data is received at a buffer storage unit at a rate greater than the rate at which the data can be removed from the buffer storage unit by the operation of the printer. In response to this anticipation, a restraint pulse is generated which inhibits the further transmission of information from the data source until the printer has caught up. Further logic circuitry insures that only a single restraint signal is generated.

With this detailed description of the logic circuitry and the operation of the present invention, it will be obvious to those skilled in the art that various modifications can be made without departing from the spirit and scope of the invention which is limited only by the appended claims.

What is claimed is:

1. In a data transmission system including means for transmitting coded representations of characters in a stream of data, a pair of buffer storage units for alternately and individually receiving a coded representation of a character, a rotating print element having a plurality of characters and a reference location on the periphery thereof, means for alternately and individually scanning said buffer storage units and means for comparing the coded representation of a character stored therein with the characters on the periphery of said printing element for utilizing the character in printing and wherein the transmission of said representations of characters, and the utilization of character representations stored in said buffer storage units, as timed to the operation of said rotating print element, normally exist in a state of synchronization, a logic circuit for preventing a loss of information due to a variance from said normal state of synchronization comprising:

first means for detecting the satisfaction of a first logic condition wherein one of said pair of buffer storage units is scheduled to receive the next coded representation of a character to arrive and is simultaneously being scanned for comparing the coded representation stored therein with the characters on the periphery of said rotating print element;

second means for detecting the satisfaction of a second logic condition, said second logic condition requiring the simultaneous occurrence of a pulse indicative of the frequency of rotation of said print element and a pulse indicative of the frequency of transmission of said coded representations;

means responsive to the simultaneous detection of the satisfaction of said first and second logic conditions for generating a triggering pulse;

first bistable means responsive to said triggering pulse for generating a restraint pulse and inhibiting the further transmission of said coded representations of characters;

second bistable means for normally enabling said restraint pulse-generating means, said means being responsive to said triggering pulse for disenabling said generating means and preventing the generation of more than one restraint pulse until said normal state of synchronization is restored; and means responsive to conditions indicative of the restoration of said normal state of synchronization for returning said second bistable means to its normally enabling state.

2. A logic system for preventing a loss of transmitted data which may occur whenever the rate at which data is transmitted to a remote data terminal having a plurality of buffer storage units, one of said plurality of buffer storage units normally operating to receive said transmitted data while one of said plurality of buffer storage units stores the data currently being utilized by said remote data terminal, exceeds the rate at which data is utilized at the remote data terminal, said logic system comprising:

means for generating signals indicative of the rate of utilization of data at the remote data terminal;

first means for determining which one of said plurality of buffer storage units is currently being loaded with the incoming data;

second means for determining which one of said plurality of buffer storage units contains the data currently being utilized;

means responsive to said first and second determining means, to said incoming data and to said signals indicative of the rate of utilization of said data for detecting the attainment of a predetermined logic state indicative of an impending loss of data; and means responsive to said detecting means for temporarily inhibiting further transmission of data so as to prevent said losses.

3. The logic system of claim 2 wherein said means for temporarily inhibiting further transmission of data includes:

first logic means for generating a restraint signal to temporarily inhibit said further transmission of data; and second logic means for preventing the generation of more than one restraint signal.

4. An improved data system having a means for transmitting characters of information and a terminal means including a plurality of buffer storage units for alternately and individually receiving and storing individual characters of information, each of said plurality of buffer storage units being capable of receiving and storing a single character of information before another of said plurality of buffer storage units begins to receive the next successively transmitted character of information, said terminal means further including means for alternately scanning the stored contents of individual ones of said plurality of buffer storage units, and cyclic printing means including a rotating printing element, hammer assembly means, means for sensing characters and a reference position on the rotating print element, and means responsive to said character sensing means and to said scanning means for comparing the characters on said rotating print element with the character stored in the individual one of said plurality of buffer storage units currently being scanned by said scanning means, and means responsive to said comparison means for actuating said hammer assembly means to print said stored character when a valid comparison exists, and wherein characters of information are normally being received by said plurality of buffer storage units at a rate approximately equal to the rate at which characters are being scanned by said scanning means for printing by said cyclic printing means, the improvement in said data system comprising logic circuit means for preventing a loss of one or more transmitted characters of information which may occur whenever characters are being received by said plurality of buffer storage units at a rate greater than the rate at which characters are being scanned by said scanning means for printing by said cyclic printing means, said logic circuit means comprising:

means for determining if characters of data are being received by said plurality of buffer storage units at a rate greater than the rate at which characters are being scanned by said scanning means for printing by said cyclic printing means; and means responsive to said determining means for generating a restraint signal for temporarily inhibiting said means for transmitting characters so as to prevent said loss of one or more characters of information.

5. The improved data system of claim 4 wherein said determining means includes:

load control means for determining which one of said plurality of buffer storage units is currently receiving and storing the incoming character of information;

scan control means associated with said cyclic printing means for determining which one of said plurality of buffer storage units is currently being scanned by said scanning means;

logical gating means responsive to the parity of the character of information currently being received by said plurality of buffer storage units, to said load control means, to said scan control means and to said sensing means for detecting the occurrence of a predetermined set of logic conditions indicative of an impending loss of one or more characters of information and for passing a gated signal in response thereto; and bistable means responsive to said gated pulse for generating a restraint-triggering pulse.

6. The improved data system of claim 5 wherein said means for generating a restraint signal includes means responsive to said restraint-triggering pulse for generating said restraint signal and means for preventing the generation of more than one restraint signal.

7. The data system of claim 6 wherein said means for preventing the generation of more than one restraint signal includes:

bistable flip-flop means responsive to said restraint-triggering pulse for generating an inhibit pulse for disenabling said restraint signal generating means to prevent the further generation of said restraint signal;

second logical gating means responsive to the parity of the character of information currently being received by said plurality of buffer storage units, to said sensing means, to said load control means, and to said scan control means for detecting the occurrence of a second predetermined set of logic conditions indicating that characters of information are once more being received by said plurality of buffer storage units at a rate approximately equal to the rate at which characters are being scanned by said scanning means for printing by said cyclic printing means and for passing a second gated pulse in response thereto; and second bistable means responsive to said second gated pulse for generating a termination pulse, said means for generating an inhibit pulse being responsive to said termination pulse for terminating the generation of said inhibit pulse and for generating a pulse for re-enabling said restraint signal generating means.

* * * * *